United States Patent [19]
Li et al.

[11] Patent Number: 5,302,812
[45] Date of Patent: Apr. 12, 1994

[54] LASER SCANNING DEVICE WITH AUTOMATIC RANGE AND SPOT SIZE ADJUSTMENT

[75] Inventors: Yajun Li, Oakdale; Joseph Katz; Paul Dvorkis, both of Stony Brook, all of N.Y.

[73] Assignee: Symbol Technologies, Inc., Bohemia, N.Y.

[21] Appl. No.: 812,605

[22] Filed: Dec. 23, 1991

[51] Int. Cl.$^5$ .............................................. G06K 7/10
[52] U.S. Cl. ................................... 235/462; 235/467; 235/472; 359/824
[58] Field of Search ............... 235/462, 467, 472, 466; 359/824

[56] References Cited

U.S. PATENT DOCUMENTS

| | | | |
|---|---|---|---|
| 4,004,852 | 1/1977 | Pentecost | 356/1 |
| 4,251,798 | 2/1981 | Swartz et al. | 335/472 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,720,185 | 1/1988 | Kurihara | 359/824 |
| 4,760,248 | 7/1988 | Swartz et al. | 235/472 |
| 4,794,239 | 12/1988 | Allais | 235/462 |
| 4,808,804 | 2/1989 | Krichever et al. | 235/462 |
| 4,816,920 | 3/1989 | Paulsen | 359/824 |
| 4,818,886 | 4/1989 | Drucker | 235/462 |
| 4,831,275 | 5/1989 | Drucker | 250/566 |
| 4,896,026 | 1/1990 | Krichever et al. | 235/472 |
| 4,897,532 | 1/1990 | Swartz et al. | 235/467 |
| 4,916,318 | 4/1990 | Iima | 250/568 |
| 4,920,255 | 4/1990 | Gabeler | 235/454 |
| 4,933,538 | 6/1990 | Heiman et al. | 235/462 |
| 5,010,242 | 4/1991 | Frontino | 235/467 |
| 5,015,833 | 4/1992 | Mattei et al. | 131/281 |
| 5,170,277 | 12/1992 | Bard et al. | 235/462 |

OTHER PUBLICATIONS

"Optical System Design", by Rudolph Kingslake, pp. 73–74; 1983.

Applied Optics Journal, vol. 24, No. 12, Jun. 1985, p. 1732, "Magnification Equations for a Two-Lens System", by D. S. Goodman.

NASA Tech. Briefs, May 1987, pp. 33–34, "Scanning System for Laser Velocimeter", Ames Research Center.

NASA Tech Briefs, Oct. 1987, pp. 44 & 46, "Ultrasonic Ranging System with Increased Resolution", L. B. Johnson Space Center.

*Primary Examiner*—Donald Hajec
*Assistant Examiner*—Esther H. Chin

[57] ABSTRACT

A laser scanning head in which the range of the beam waist is varied independently of any measurement of the actual range of the symbol. The optical member is a condenser lens that is moved by energizing a magnetic coil; the lens is operated independently of the scanning movement of the laser beam, to produce a continuous, progressive variation (e.g., a continuous oscillation) in the range of the beam waist, so that at some point in the variation the spot size on the symbol will be of an appropriate size. The movement of the lens can be synchronized with the beam scan (e.g., so that the same spot size can be maintained for several scans). Spot size can be chosen adaptively, by varying the range of the beam waist until the contrast in the reflected light collected from the symbol exceeds a predetermined level.

9 Claims, 8 Drawing Sheets

LASER SCANNING DEVICE WITH AUTOMATIC RANGE AND SPOT SIZE ADJUSTMENT

FIELD OF THE INVENTION

The invention relates to laser light sources for laser scanning heads of the type used to read symbols such as bar codes where different portions of the symbol have different reflectivity.

BACKGROUND OF THE INVENTION

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, the light beam, at a target and a symbol to be read.

The light source in a laser scanner is typically a gas laser or semiconductor laser. The use of a semiconductor devices such as a laser diode as the light source in scanning systems is especially desirable because of their small size, low cost and low power requirements. The laser beam is optically modified, typically by a condenser lens, to form a waist-shaped beam in which the width of the beam diminishes with distance until reaching a minimum, or waist, and then increases. The beam is focused so that a desired spot size is achieved at the target distance, typically so that the waist is located at the target distance. It is preferred that the spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, groups of elements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include, e.g., UPC/EAN, Code 39, Code 128, Codabar, and Interleaved 2 of 5, etc.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across and past the symbol, or scan the field of view of the scanner, or do both. Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Bar code symbols are printed in varying densities. High density symbols (line widths <5 mil) are, for example, used for small parts (e.g., integrated circuits) and for symbols with high information density. Low density symbols (line widths ≧50 mil) are, for example, used for coding packages (e.g., UPC/EAN symbols) and containers in warehouses. As it is generally preferred that the beam scanned across the bar code symbol have a width comparable to that of the minimum width between regions of different light reflectivity (e.g., the minimum width of a bar element), different beam widths are needed to read different density bar codes. Furthermore, bar codes of the same density can be located at varying distances from the laser scanning head, and thus there is a need to vary the beam spot size at each of many different ranges from the scanning head.

Conventional laser scanners have a condenser lens that focuses the laser diode so that the spot size is correct at the range at which the bar code reader is expected to operate. With such fixed focus systems, there is typically a "dead zone" in front of the scanner in which the spot size is too large for scanning to occur. Also, such scanners must be focused at the factory by adjusting the condenser lens along the optical axis while observing the spot size and then permanently setting the position of the lens at the position that achieves the desired size. This step is a relatively costly one, adding to the cost of manufacturing the laser scanner.

Various proposals have been made for improvements over these fixed focus scanners. A prior filed U.S. patent application of Bergstein, U.S. Ser. No. 07/503,374, discloses an afocal optical system in which the laser beam is collimated so that its width (or spot size) remains approximately constant over a wide range (i.e., so as to reduce as much as possible the waist shape of the beam). Krichever et al. U.S. Pat. No. 4,808,804 shows moving different condenser lens elements into and out of the optical path of the laser beam, and moving the laser diode along the optical axis, to vary the working distance and/or the spot size of the beam. Gabeler U.S. Pat. No. 4,920,255 shows a bar code reading system in which the range of the surface bearing the bar code is detected using an ultrasonic ranging system, and the detected range is used to prescribe the setting of the optics focusing a laser beam on the bar code (the output signal from the ultrasonic ranging system drives a stepper motor in the laser focusing optics). Drucker U.S. Pat. No. 4,831,275 discloses a variety of means for optically modifying the light reflected from the bar code symbol, to vary the distance at which the symbol is in focus on the photodetector within a bar code reader; the techniques taught include altering the shape of a lens, moving an aperture in the optical path, moving a mirror (or a fiber optic cable), and providing an array of sensors, each effectively focused at a different range. U.S. Pat. No. 4,333,006 discloses the use of a plurality of varying focal length holograms generated by a rotating disk to focus at differing overlapping distance ranges.

SUMMARY OF THE INVENTION

In general the invention features a laser scanning head in which the range of the beam waist is varied independently of any measurement of the actual range of the symbol. In preferred embodiments, the optical member is a condenser lens that is moved by energizing a magnetic coil; the lens is operated independently of the scanning movement of the laser beam, to produce a continuous, progressive variation (e.g., a continuous oscillation) in the range of the beam waist, so that at some point in the variation the spot size on the symbol will be of an appropriate size. In other preferred embodiments, the movement of the lens is synchronized with the beam scan (e.g., so that the same spot size can be maintained for several scans).

In still other preferred embodiments, spot size is chosen adaptively, by varying the range of the beam waist until the contrast in the reflected light collected from the symbol exceeds a predetermined level. This technique has substantial advantages over other approaches, e.g., it shortens the time required to decode, produces more accurate decoding, and reduces the amount of movement of the optical members (and thus the wear on the mechanism and energy consumed as a consequence of the movement). The adaptive approach takes advantage of the way in which bar code scanners are often used; the same scanner may be used for different ranges, and even for different densities, but it will typically be used repeatedly at the same range and same density for an extended period of time. By adaptively selecting the range of the beam waist, the range can be set and held for an extended period, with perhaps only small and infrequent adjustments. Thus, decoding occurs more rapidly (as the time wasted when the range is cycled through inappropriate values is eliminated) and more accurately (as the spot size on the beam can be adjusted more gradually, and does not even have to be moved most of the time).

The invention takes advantage of the variation in beam width to provide all range, all density scanning. Rather than trying to reduce or eliminate the waist shape of the laser beam, as done in afocal systems, the invention uses the waist shape to advantage. At any given symbol range, the waist location is moved to ranges beyond or in front of the symbol in order to enlarge the spot size at the symbol. Thus, at any of a wide variation of symbol ranges, a wide variation in spot size can be achieved. This allows the same laser scanning head to be used successfully in many different applications.

A further advantage of the invention is that it can greatly reduce the "dead zone" in front of a scanner.

A still further advantage is that factory adjustment of focus can be avoided altogether, and thus the invention can be of benefit even where the scanner is intended for one range and one density, for it reduces the manufacturing cost of even these simpler scanning heads.

The invention avoids the complexity and cost of using a separate range finding sensor to determine target range and then prescribe changes in focus. The synchronous mode of the invention, in which the beam range (i.e., the range of the beam waist) is moved from one range to another, and held at a fixed range at each step for a predetermined number of scan cycles, is particularly useful for bar code scanners with high scanning rates.

Other features and advantages of the invention will be apparent from the following description of preferred embodiments, and from the claims.

DETAILED DESCRIPTION OF THE PREFERRED EMBODIMENTS

Figures 1, 2:
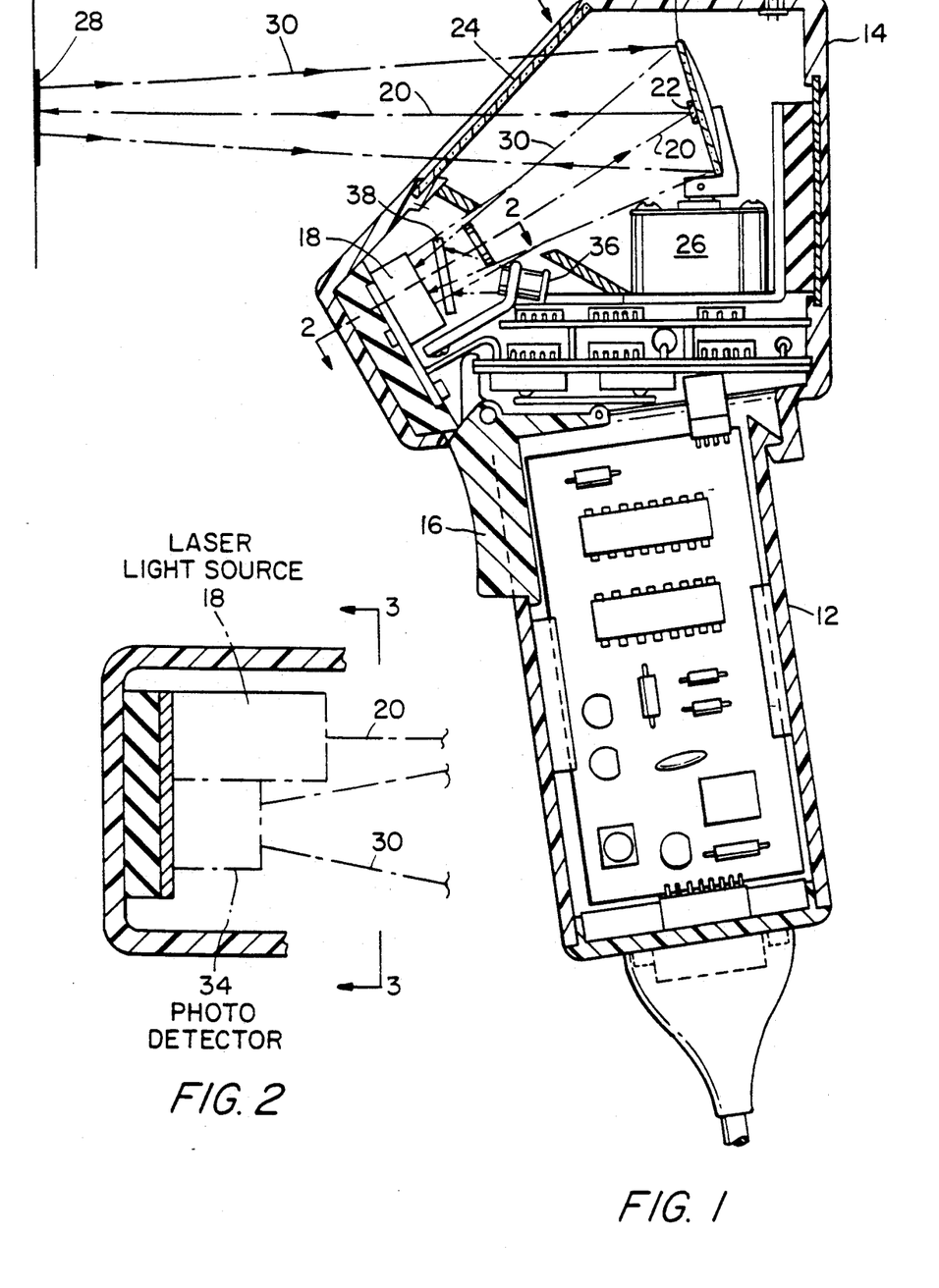
FIG. 1 is cross-sectional view through a laser scanning head incorporating the laser light source of the invention.
FIG. 2 is a cross-sectional view taken on line 2—2 of FIG. 1, showing the location of the laser zooming system and adjoining photodetector.

Shown in FIG. 1 is a hand-held laser scanning head 10 of the type more fully described, for example, in U.S. Pat. No. 4,897,532 (incorporated by reference). Other types of laser scanning heads can be used with the invention. Laser scanning heads are useful for reading symbols composed of portions having different light reflective properties. Such symbols include black and white industrial symbols, e.g., Code 2=39, Codabar, Interleaved 2 of 5, etc., and also the omnipresent UPC bar code symbol. The symbols may also be any alphabetic and/or numeric characters. Included are symbols located in a background field, wherein the symbols, or at least a portion thereof, have a different light reflective property than that for the background field. Reading such symbols is of particular benefit in the fields of robotics and object recognition.

Turning to FIGS. 1-2, the head 10 includes a generally gun-shaped housing having a handle portion 12 and body portion 14. A manually-actuated trigger 16 activates the scanner, causing laser light source 18 to emit a laser beam along optical axis 20. The beam is reflected by scanning mirror 22, emerges from the scanning head through window 24, and strikes symbol 28 (the range of the symbol in front of the scanning head is not shown to scale in the drawing). The scanning mirror 22 is mounted on a high-speed scanner motor 26, which reciprocally and repetitively oscillates the mirror to cause the laser beam to scan back and forth across the indicia 28. Light reflected from the symbols is collected by generally concave, spherical collecting mirror 32, which defines a cone 30 of reflected light. (Mirror 22, which reflects the laser beam, is a small flat mirror positioned along one side of concave collecting mirror 32.) The cone 30 of reflected light is directed by mirror 32 to photodetector 34 (preferably a photodiode), which generates an electrical analog signal indicative of the detected variable light intensity. Mirror 32 may also serve to focus and direct an aiming beam of light along the same axis as the laser beam. The aiming beam is generated by light source 36 (e.g., a visible light emitting diode (LED), an incandescent white light source, or a xenon flash tube), and reflected toward concave mirror 32 by a cold mirror 38, which is transmissive at the wavelengths of the laser beam, but reflective at the wavelengths of the aiming beam.

Figure 3A:
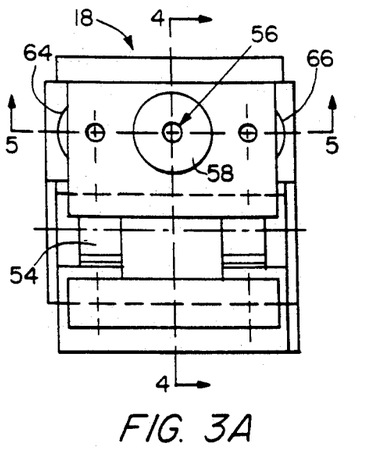
FIG. 3A is an elevation view taken on line 3—3 of FIG. 2, showing one embodiment of the laser light source of the invention.
Figure 3B:
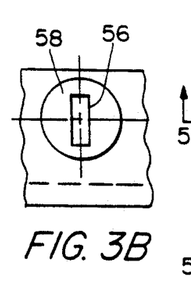
FIG. 3B is a partial elevation view taken on line 3—3 of FIG. 2, showing an alternative aperture.
Figure 4:
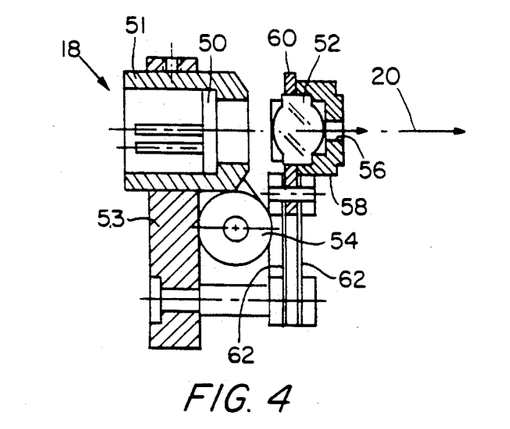
FIG. 4 is a cross-sectional view taken on line 4—4 of FIG. 3A.
Figure 5:
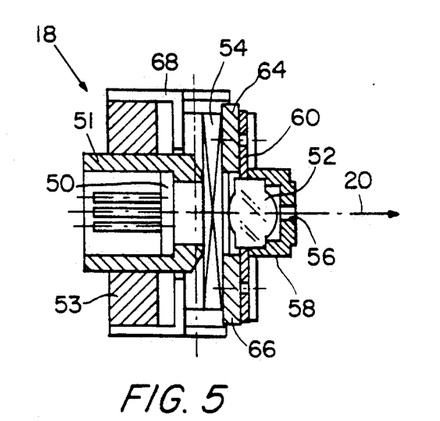
FIG. 5 is a cross-sectional view taken on line 5—5 of FIG. 3A.

Turning to FIGS. 3A, 3B, 4, and 5, there is shown one preferred embodiment of the laser light source. Laser diode 50 is supported in laser holder 51, which is secured to base 53. The laser diode emits a laser beam along optical axis 20. The beam is focused by condenser lens 52, which is moved longitudinally along the optical axis by activation of magnetic coil 54. Light emerging from lens 52 passes through aperture 56, which may, e.g., be a circular opening (FIG. 3A) or a rectangular slit (FIG. 3B). Lens 52 is supported in support member 60. Aperture 56 is formed in aperture member 58, which fits over the lens. The lens support member 60 is supported on a pair of leaf springs 62, so that it can oscillate longitudinally along the optical axis. Two permanent magnets 64, 66 and soft-iron portions 68 are also supported by the leaf springs. Movement of the condenser lens is achieved by varying the strength of the field generated by the magnetic coil 54.

Figure 6:
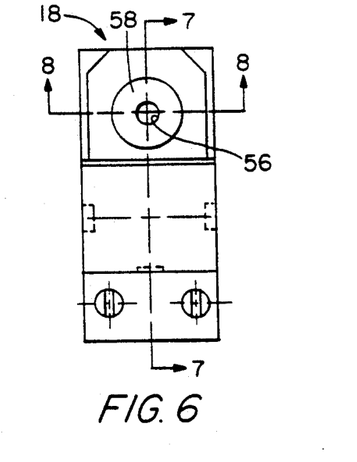
FIG. 6 is an elevation view taken on line 3—3 of FIG. 2, showing another embodiment of the laser light source of the invention.
Figure 7:
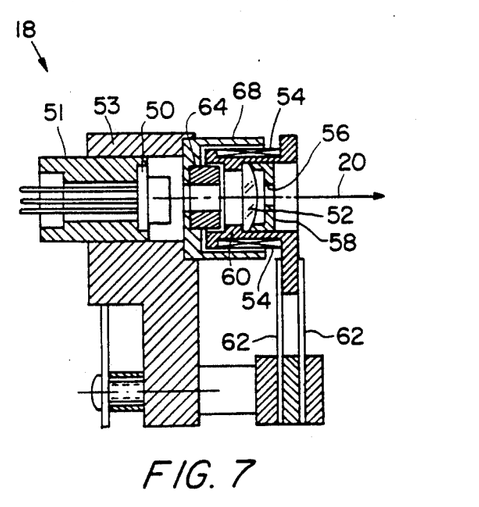
FIG. 7 is a cross-sectional view taken on line 7—7 of FIG. 6A.
Figure 8:
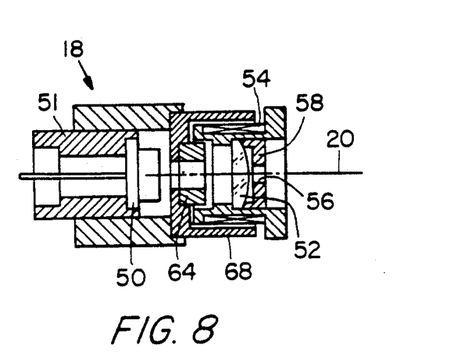
FIG. 8 is a cross-sectional view taken on line 8—8 of FIG. 6A.

Another preferred embodiment of the laser light source 18 is shown in FIGS. 6-8. Laser diode 50 is supported in holder 51, which is secured in base 53. The laser beam emitted by the diode passes along optical axis 20 through condenser lens 52 and aperture 56, which may be a circular opening (FIG. 6A) or a rectangular slit (not shown, but similar to FIG. 3B). The aperture is formed in aperture member 58, which fits over the lens. Movement of the condenser lens is achieved in this embodiment by mounting the magnetic coil 54 on the lens support member 60, so that the coil moves with the lens. The lens support member 60 is supported on a pair of leaf springs 62. The permanent magnet 64, which has a hole through its center for passing the laser beam, and associated soft iron member 68 are fixed in place relative to the laser diode. As the amplitude of the alternating current to the coil is increased, the coil is drawn toward the permanent magnet 64, and further within surrounding soft-iron member 68. Placing the magnetic coil on the moving member, and the heavier permanent magnet and soft-iron member on the fixed member, lightens the mass that must be moved, and thus improves the high frequency response of the lens movement. Also shown in FIG. 7 is the photodetector 34, fastened to base 53.

Figure 9:
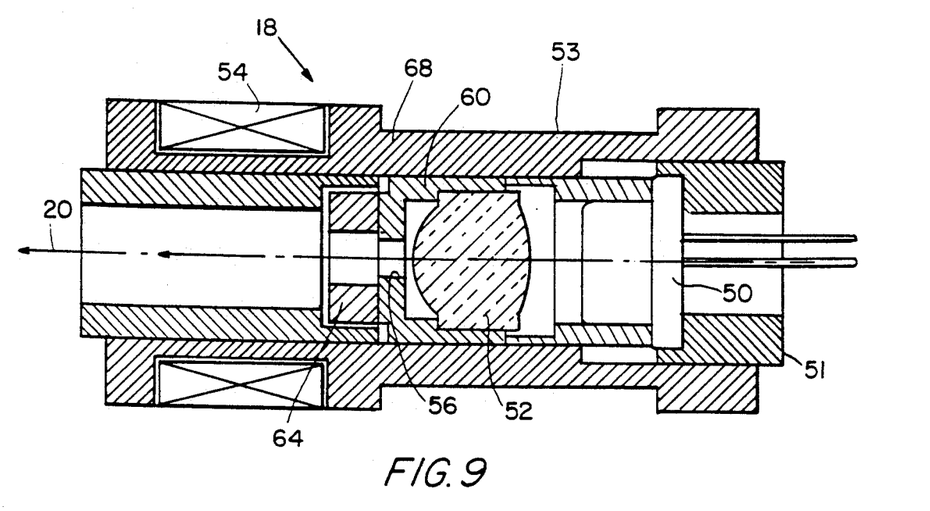
FIG. 9 is a cross-sectional view through a further embodiment of the laser light source of the invention.

A third preferred embodiment of the laser light source is shown in FIG. 9. In this embodiment, the magnetic coil and soft-iron member 68 are fixed to base 53, and the permanent magnet 64 is mounted with the movable lens. The laser beam emitted by the laser diode 50, supported in laser holder 51, passes through condenser lens 52, aperture 56, and an opening in the permanent magnet 64. The lens 52, lens support member 60, and permanent magnet 64 move toward the magnetic coil 54 when the field strength of the coil is increased.

Figure 10:
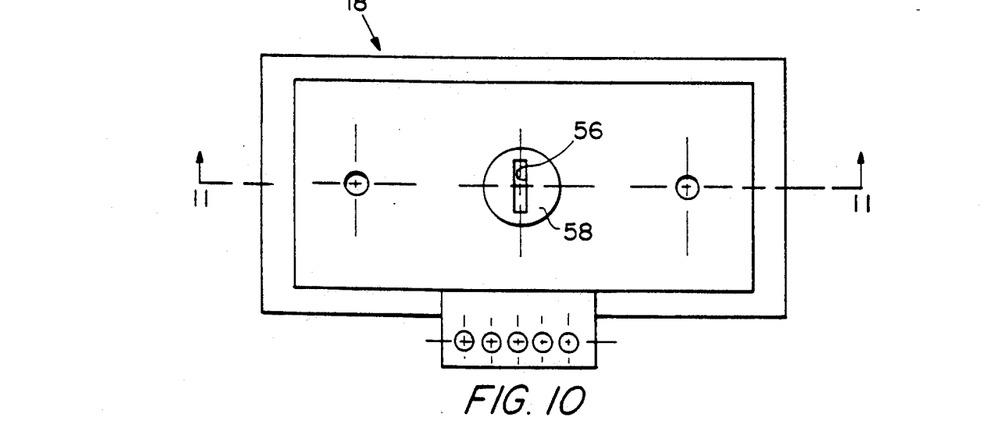
FIG. 10 is an elevation view taken on line 3—3 of FIG. 2, showing another embodiment of the laser light source of the invention.
Figure 11:
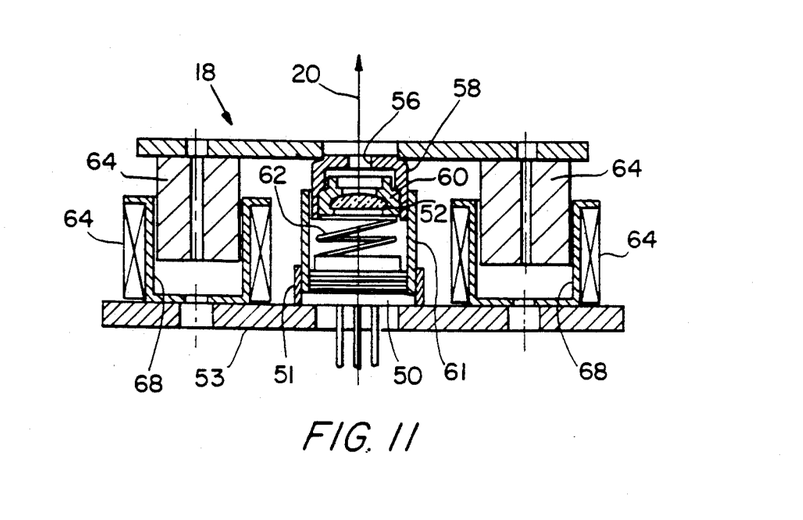
FIG. 11 is a cross-sectional view taken on line 11—11 of FIG. 10.

A fourth preferred embodiment of the laser light source is shown in FIGS. 10-11 Laser diode 50 is secured to base 53. Condenser lens 52 is supported in lens support member 60, over which fits aperture member 58 with aperture 56. The lens support and aperture members ride within tubular housing 61. Helical spring 62 resists movement of the lens and lens support member toward the laser diode. Two permanent magnets 64 move with the lens assembly. The magnets are received within soft-iron jackets 68 surrounded by magnetic coils 64. Increasing the amplitude of the current supplied to the magnetic coils 64 causes the permanent magnets 64 to be drawn toward the magnetic coils, thus shortening the separation between the condenser lens and the laser diode.

Figure 12:
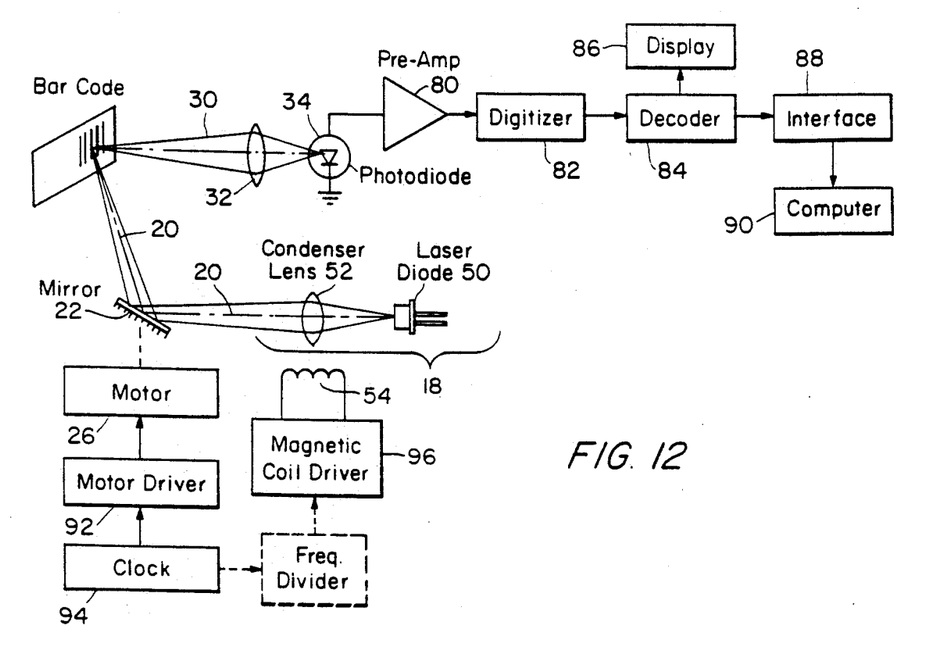
FIG. 12 is a combined optical schematic and electrical block diagram of one embodiment of the invention.

Anyone of the four described laser light sources can be used with one of three preferred lens control systems. The first lens control system is shown in FIG. 12. The basic optical path is shown diagrammatically in the figure. The laser beam emitted by laser diode 50 is focused by condenser lens 52, and scanned across the bar code symbols by oscillating mirror 22. Light reflected from the bar code is collected by focusing mirror 32 (shown as a lens) and focused onto photodiode 34. The output of the photodiode is processed in a manner well known in the art. The signal is amplified by pre-amp 80 to produce an analog signal representative of the variation in reflectivity of the scanned bar code. The analog signal is then digitized by digitizer 82, and the digital signal is decoded by decoder 84 to provide the string of characters represented by the bar code. The decoded characters can be displayed on display 86 and/or supplied through an interface 88 to a digital computer 90.

The electronic circuitry controlling the laser light source and scanning mirror are also shown in FIG. 12. Mirror 22 is oscillated by motor 26 under control of motor driver 92 and clock 94. The position of condenser lens 52 is continuously oscillated by condenser lens driver 96, driving magnetic coil.

Figure 13:
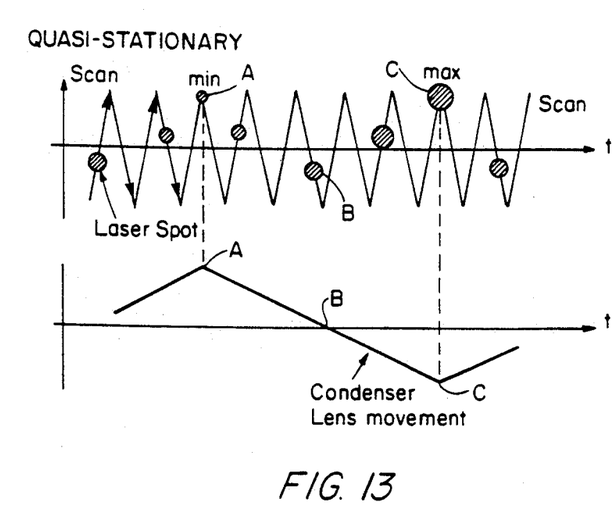
FIG. 13 is a graphical presentation of the variation in laser spot size for one embodiment of the invention.

FIG. 13 shows graphically the variation in laser beam focusing that is achieved by oscillating the condenser lens. The movement of the condenser lens is represented by the lower graph; the movement is shown as piecewise linear, but it could, as well, be sinusoidal or another shape. The upper graph shows the scanning movement of the laser beam, and superimposed on the curve is the "spot size" of the laser beam at a few points in time. For clarity only a few "spot size" representations are shown. For example, at time A, the condenser lens is at one extreme end of its travel corresponding to the smallest spot size. At time B, the lens has travelled to a point corresponding to an intermediate spot size. At time C, the lens has reached its opposite extreme, corresponding to a maximum spot size. Thus, in the time required to complete ten scans across the bar code indicia, the spot size has been varied from a minimum to a maximum. This embodiment is referred to as quasi-stationary movement of the lens, as the movement is quite slow relative to the scan rate.

Figure 14:
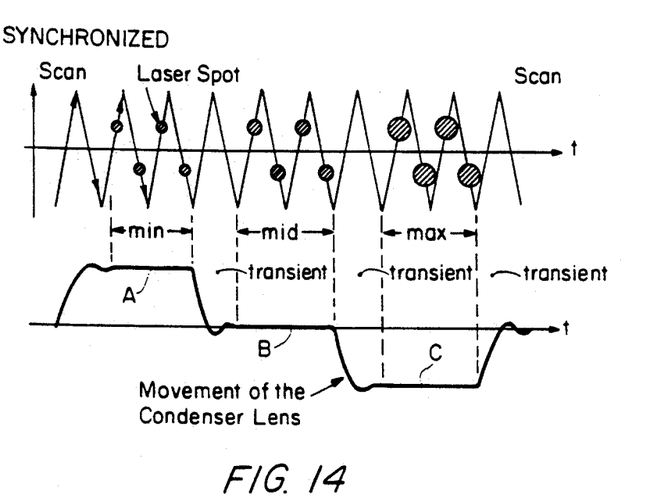
FIG. 14 is a graphical presentation of the variation in laser spot size for another embodiment of the invention.
Figure 15:
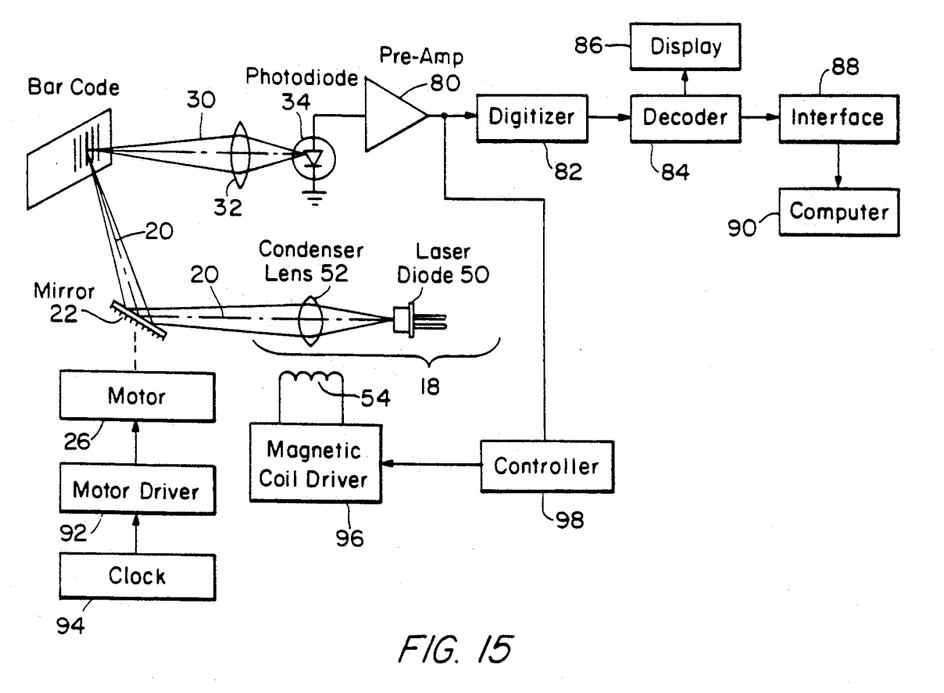
FIG. 15 is a combined optical schematic and electrical block diagram of one embodiment of the invention.

A second preferred lens control system is also shown in FIG. 12. A frequency divider or similar circuit, under control of the same clock that drives the beam scanning mirror, governs the movement of the condenser lens. As shown in FIG. 14, the lens is moved between three different positions in this embodiment. The lens remains in position A, at which the laser spot size is a minimum, for four scans across the bar code indicia. Then, the lens is moved to position B, which corresponds to a mid-sized laser spot, and it is again held in that position for four scans across the indicia. Next, the lens is moved to position C, which corresponds to a maximum-sized laser spot, and it is held there for a further four scans across the indicia. Finally, the lens is moved back to position A, to begin the cycle all over again.

Figure 16:
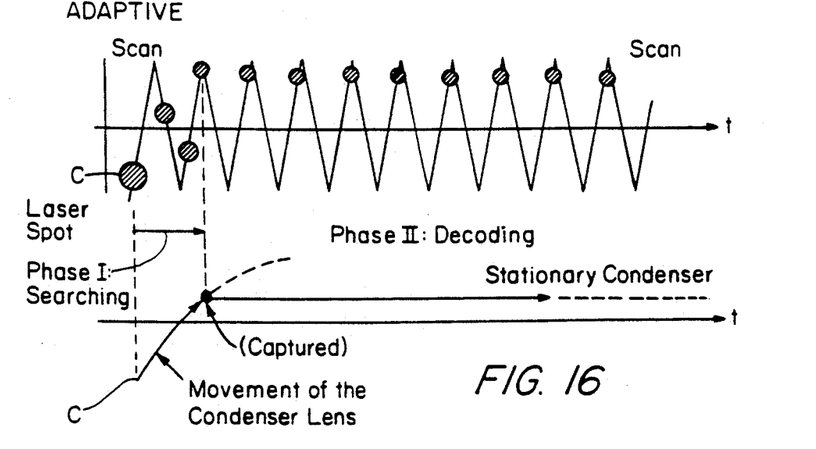
FIG. 16 is a graphical presentation of the variation in laser spot size for a another embodiment of the invention.

The third, and most preferred, embodiment of the lens control system is shown in FIG. 16. This is an adaptive system, in which the position of the condenser lens is set in response to feedback from the photodiode. When the trigger on the laser scanner is activated, the lens begins at a position C, which corresponds to the maximum spot size. During what is known as Phase I, the lens is slowly moved, with a corresponding reduction in the spot size, until the output of pre-amp 80 signals controller 98 that the spot size has reached a dimension sufficient to produce the desired degree of variation in reflected light. At that point, which is called "capture", controller 98 freezes the condenser lens position for the duration of the scan (Phase II). Alternatively, if the output of pre-amp 80 falls off, and "capture" is lost, the controller can be designed to begin a further search for an acceptable position for the condenser lens.

Capture occurs when there is sufficient contrast in the analog signal. Contrast, C, can be expressed as $$C = \frac{I_{MAX} - I_{MIN}}{I_{MAX} + I_{MIN}}$$

in which $I_{MAX}$ is the value of the analog signal at a peak, which corresponds to the light reflected from a light-colored (e.g., white) region of the indicia, and $I_{MIN}$ is the value of the analog signal at a minimum, which corresponds to the light reflected from a dark-colored (e.g., black) region of the indicia. Capture occurs when the contrast, C, exceeds a predetermined limit $$C \geq C_0$$

where $C_0$ is a constant. The value of $C_0$ used will depend on the performance of the digitizer that converts the analog signal into a digital signal. The better the performance of the digitizer the smaller can be the value of $C_0$.

Figure 17:
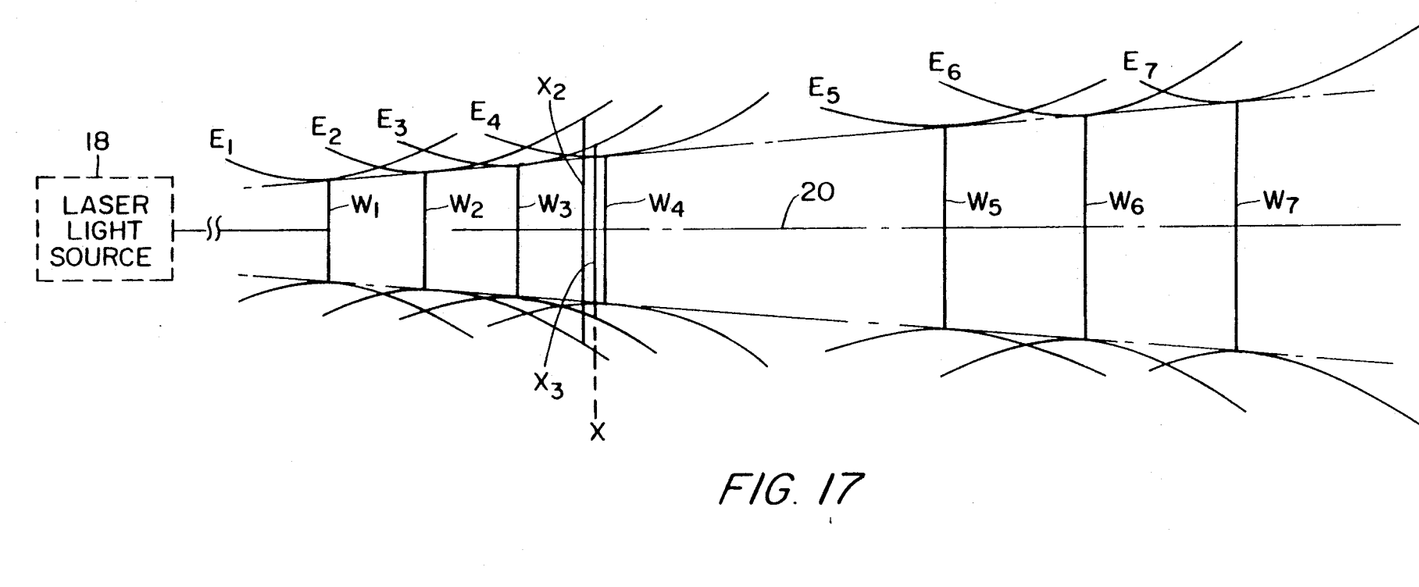
FIG. 17 is a diagrammatic representation (not to scale) of the waist shape of the laser beam at different ranges of the laser beam, i.e., at different positions of the condenser lens.

We have spoken so far of the "spot size" of the laser beam. Turning to FIG. 17, the meaning of "spot size" can be explained. The laser beam produced by laser diode 50 and condenser lens 52 is not perfectly collimated. The width of the beam varies along the optical axis. Thus, for example, when the condenser lens is at one extreme end of its travel the corresponding laser beam would have the envelope marked $E_1$ (not drawn to scale) in FIG. 17. The width of the beam varies, but is a minimum at the "waist", location $W_1$. As the condenser lens translates toward the other end of its travel, the waist of the laser beam moves further away from the light source. Several of the envelopes defining the laser beam at various stations of the condenser lens are shown, e.g., envelopes $E_2$–$E_7$. What is important to note is that the size of the waist of the laser beam grows steadily larger as the location of the waist moves away from the light source. Thus, $W_2$ is larger than $W_1$, and so on, with $W_7$ being the waist dimension when the condenser lens has reached the other end of its travel.

The variation in beam width at any given condenser lens location advantageously makes it possible to produce a variation in "spot size" at the same range. Thus, e.g., if the bar code symbol being scanned was located at position X, the spot size could be varied to accommodate a variety of bar code densities. The minimum spot size would be achieved with the condenser lens in a position corresponding to beam envelope $E_4$, thus producing a waist $W_4$. Larger spot sizes can be achieved by moving the condenser lens away from the $E_4$ position, e.g., to positions corresponding to envelopes $E_3$ and $E_2$, at which the spot size is $X_3$ and $X_2$, respectively. The same variation in spot size can be provided at other ranges. Thus, the natural shape of the laser beam generated by a laser diode is used to advantage, to provide variation in spot size at varying ranges.

Figure 18:
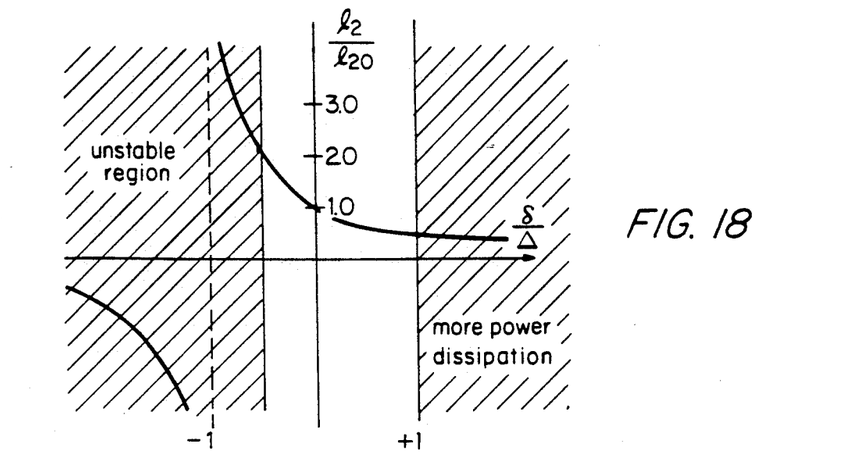
FIGS. 18 and 19 are graphical presentations of the relationship between the condenser lens position and the range of the laser beam.
Figure 19:
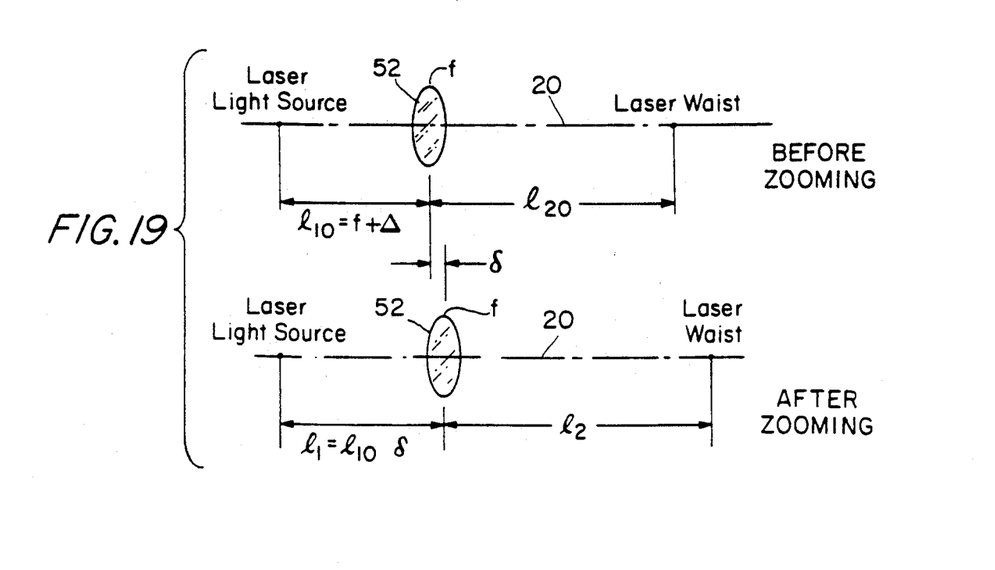

FIGS. 18-19 show the relationship between condenser lens position and the range of the laser beam (i.e., the position of the beam waist). The situation before zooming is shown in the top half of FIG. 19. The distance of the beam waist from the lens, $l_{20}$, can be expressed as a function of the focal length, f, and location of the light source (i.e., the laser diode), $l_{10}$, which equals $f + \Delta$. Thus, before zooming, we have $$l_{20} = \frac{f(f + \Delta)}{f + \Delta - f} \simeq \frac{f^2}{\Delta}$$

After zooming, the lens has moved by an amount $\delta$, to shift the location of the beam waist to $l_2$, which can be expressed as $$l_2 = \frac{f(l_{10} + \delta)}{l_{10} + \delta - f} = \frac{f(f + \Delta + \delta)}{\Delta + \delta}$$
$$\simeq \frac{f^2}{\Delta + \delta} = \frac{l_{20}}{1 + (\delta/\Delta)}.$$

Therefore $$\frac{l_2}{l_{20}} \simeq \frac{1}{1 + (\delta/\Delta)}.$$

The practically applicable region for $(\delta/\Delta)$ is $$-0.5\Delta \leq \delta \leq \Delta.$$

If $\delta$ is outside this range, operation may become unstable or produce undesirably high power dissipation (FIG. 18). The corresponding variation in image distance, i.e., beam waist range, is $$l_2 = (0.5 - 2.0) l_{20}$$

Figure 20:
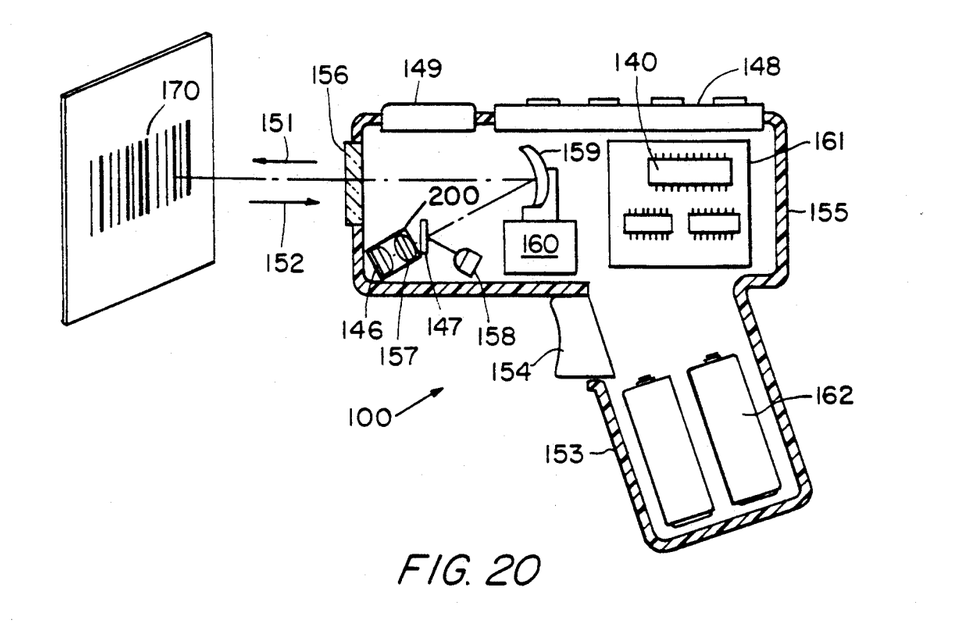
FIG. 20 is a longitudinal sectional view through another embodiment of a laser scanning head incorporating the laser light source of the invention.
Figure 21:
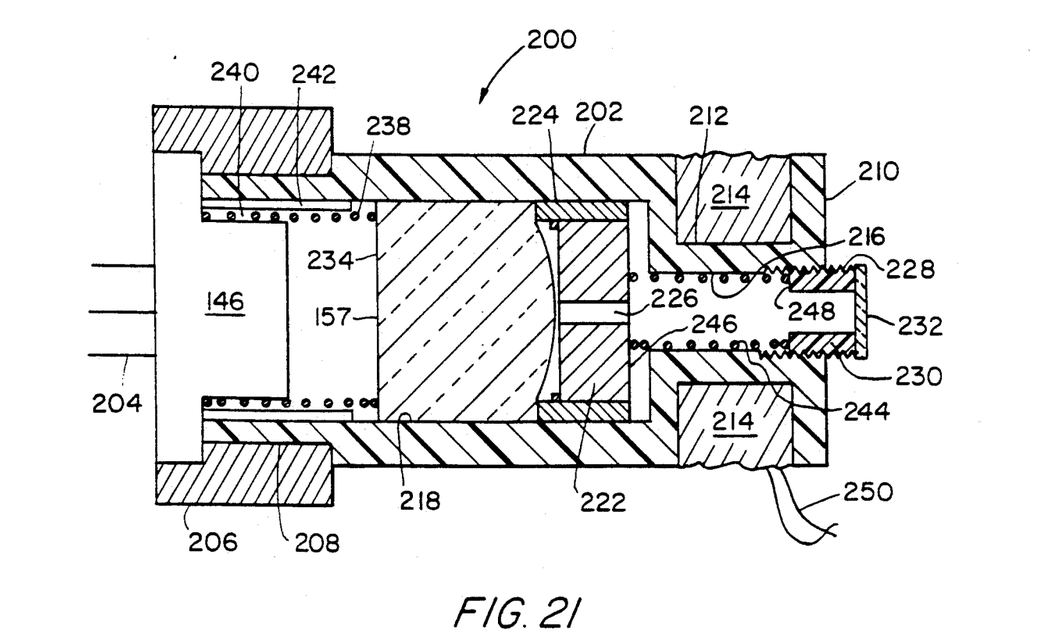
FIG. 21 is a longitudinal sectional view through another embodiment of the laser light source of the invention.

Another embodiment of the invention is shown in FIGS. 20 and 21. A laser scanning device may be a bar code reader unit 100 in a hand-held gun-shaped configuration, although obviously other kinds of configurations of scanners readily lend themselves to the invention, having a pistol-grip type of handle 153 and in which a movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of from contact with the symbol to distances of perhaps several inches or even further therefrom.

As further depicted in FIG. 20, a suitable lens 157 (or multiple lens system) may be used to focus the scanned beam into the bar code symbol at an appropriate reference plane. A light source 146, such as a semiconductor laser diode, is positioned to introduce a light beam into the axis of the lens 157, (light source 146 and lens 157 being supported in housing 200) and the beam passes through a partially-silvered mirror 147 and other lenses or beam-shaping structure as needed, along with an oscillating mirror or scanning element 159 which is attached to a scanning motor 160 activated when the trigger 154 is pulled. An alternative optical arrangement is depicted in U.S. Pat. No. 5,015,833, which is hereby incorporated by reference. If the light produced by the source 146 is not visible, an aiming light, if needed, produces a visible-light spot which may be fixed, or scanned just like the laser beam; the user employs this visible light to aim the reader unit at the symbol before pulling the trigger 154.

In order to be able to utilize the scanning device to incorporate the zoom/autofocus capability; in essence, to be able to scan and read indicia on a target at various scanning ranges from the device, the reader 100 includes an inventive electromagnetic zoom arrangement for the optical system or lens 157, as shown in FIG. 20, so as to be able to shift the focus, i.e., the waist location, for a light beam or laser beam which is projected from the light source 146.

In order to accomplish the foregoing, as is particularly illustrated in FIG. 21, the electromagnetic autofocus/zoom arrangement provides for a housing structure 200 including a tubular body portion 202 which is preferably constituted from a non-metallic or plastic metal, such as teflon or the like, with an internal substantially cylindrical configuration. Fastened to one end of the tubular body portion 202 is the light source 146 for projecting a beam of light; for example, such as a laser diode connected to a suitable source of electrical energy; for instance, the battery 162, by means of wires 204. The light source or laser diode 146 is mounted in a sleeve 206, which may be brass, in either a screwth-readed engagement or in a close locking fit on the one end 208 of tubular housing body portion 202.

The opposite or second end 210 of the housing body portion 202 may have an annular recess 212 formed therein adapted to receive electrically-energizable wound coils 214 which are connected to a source for alternating-current electrical energy. This annular recess 212 forms an internal diameter 216 at the second end 210 of the tubular body portion 202 which is of a smaller diameter then the internal cylindrical diameter 218 of the body portion 202 extending towards the first end mounting the light source 146.

Arranged within the housing body portion 202 so as to be in sliding contact with the cylindrical surface 218 is the optical lens 157, or an equivalent optical focusing system, to which there is attached a permanent magnet 222 through the intermediary of an external connecting bushing 224 so as to be movable in conjunction with the optical lens 157. The magnet 222 has a central through opening 226 to permit the passage therethrough of the light or laser beam projected from the light source 146 through the focusing lens 157 towards the end 210 of the housing body portion 202. The optical lens 157 and magnet 222 which is fastened thereto by means of the bushing 224 is readily axially slidable within the internal confines of the cylindrical housing body portion 202 along the wall surface 218 in view of the low coefficient of friction which is present therebetween.

The second end 210 of the housing body portion 202 having the smaller internal diameter bore 216 has an outer end section of the bore 216 provided with a screwthreading 228 which is adapted to be engaged by complementary screwthread on a bushing 230, which is constituted of a non-ferrous metal or plastic material, and which is adapted to be threaded into or out of the bore 216. The external end surface of the bushing 230 is closed off by means of a light-transparent plate-shaped window 232 which will permit the unhindered through-passage of light therethrough, but seal off the interior of the housing 200 from the environment.

The end surface or face 234 of the optical lens 157 facing towards the light source 146 is contacted by a helical coil spring 238 proximate the perimeter of the lens 157, and with the spring 240 extending towards the light source 146 into an annular channel 240 between a sleeve 242 extending along surface 218 and a section of the light source 146. The magnet 222 is contacted by a second helical coil spring 244 extending between the surface 246 facing away from the lens 157 about the aperture 226 and the facing end surface 248 of the bushing 230. Consequently, in view of the foregoing arrangement providing a counteraction by the oppositely acting spring forces of coil springs 238 and 244, in combination with an axial differential alignment of bushing 230 within threaded bore 216, the optical element 157 and the magnet 222 which is fastened thereto, are maintained at a predetermined initial or reference axial position within the body portion 202 of the housing 200. This position determines a basic or reference location for the beam waist of a light or laser beam projected from the light source 146 through the optical lens 157, optical aperture 226 in the magnet 222, and the window 234 for the scanning and reading of indicia on a target object. Inasmuch as the interior of the housing 200 is sealed off with respect to the environment or external conditions thereof, the air contained within the housing essentially provides a cushion acting as a shock-absorbent medium in the event that the scanning device is dropped or subjected to sudden external impacts. This will protect the delicate optical components contained therein from such damage caused by external forces.

The scanning device or reader 100 pursuant to the invention is employable as an essentially adjustable angle/zoom scanner which will enable the scanning and reading of indicia located at distances from the scanning device of within a few inches or even contact up to a number of feet; for example, working ranges of from about 5 in. up to 15 ft. without the need for extensive modifications and/or incorporating additional components in the scanning device. Thus, in order to shift the focal point or beam waist of the light or laser beam projected from the light source 146 through the focusing lens 157 and the optical aperture 226 in the magnet 222, the invention contemplates the electrical energizing of the coils 214 so as to alternatingly electromagnetically attract and repel the magnet 22 so as to resultingly axially reciprocate the arrangement consisting of the optical lens 157 and the magnet 222 with the aperture 226 within the confines of the tubular housing body portion 202 along the internal cylindrical wall surface 218 thereof. In order to effectuate the foregoing, an energizing alternating current is applied to the coils 214 through suitable electrical leads 250 which are connected to a source of such electrical power, possibly that supplying the light source 146, so as to impart an electromagnetic current of reversing polarity to the magnet 222. This reciprocatory movement of the lens 157 and magnet 222 within the body portion 202 of the housing 200 acts in opposition to the restoring or equilibrating forces of the coil springs 238 and 244 tending to return the optical lens 157 and magnet 222 to an initial equilibrium position at which the beam waist is at a predetermined range. In order to attain the desired working ranges, the extent of axial reciprocatory displacement of the arrangement consisting of the optical lens 157 and magnet 222 is approximately ±15 mm from the equilibrium position; and the alternating current applied to the electromagnetic coils 214 is generally within an operating frequency of about 2–5 Hz, well below the normal scanning frequency of about 18 Hz for a typical scanning device of this type. Consequently, this will provide for a substantially automatic zooming action in a continuous mode (i.e., quasi-stationary movement) such that during a scanning operation the projeeted light or laser beam will be appropriately focused across the indicia being read by the scanning device, irrespective of the distance of the latter from the indicia.

While the invention has been illustrated and described in connection with particular embodiments, the invention has broader applicability, and thus it is not intended that the claims be limited to the details shown. Other embodiments than those shown come within the following claims. Various modifications and structural changes may be made without departing in any way from the invention. For example, movement of the condenser lens could be achieved using a small motor, a piezoelectric actuator, or a fluid-mechanical actuator.

What is claimed is:

1. In a laser scanning head for reading a symbol on a target, the symbol being of a type having regions of different light reflective properties, the symbol being positioned at a range with respect to said laser scanning head, a laser light source comprising:
   a laser source mounted on a base and oriented so that the laser beam emitted by the laser source travels generally along an optical axis,
   an optical member positioned along the optical axis so that the laser beam is focused into a beam having a cross-sectional area in a plane orthogonal to the optical axis, which varies as a function of distance from the laser source, said cross-sectional area including a waist at which the cross-sectional area of the beam is smaller than at other locations,
   means for producing relative movement of the optical member longitudinally along the optical axis, said means being operable independently of measurement of the actual range of the symbol from the scanning head, to produce a variation in the range of the beam waist independently of the actual range of the symbol further comprising circuitry for controlling the movement of the optical member and thereby the variation in the range of the beam waist, and for synchronizing said variation with scanning of the beam across the symbols so that the range remains substantially constant for a predetermined number of scans before being further adjusted.

2. The laser light source of claim 1 wherein said optical member comprises a condenser lens, and wherein said means for moving the optical member comprises a magnetic coil either fixed relative to the condenser lens or fixed relative to the laser source.

3. The laser light source of claim 2 wherein said means for moving the optical member further comprises a lens support member supporting the condenser lens, and wherein said laser light source further comprises one or more spring members resisting movement induced by said magnetic coil.

4. The laser light source of claim 3 wherein said spring members comprise leaf springs supporting said lens support member so that it can move transversely relative to the lengthwise direction of said leaf springs.

5. The laser light source of claim 3 further comprising a permanent magnet fixed relative to whichever of the laser source and the condenser lens moves relative to the magnetic coil, so that energizing the magnetic coil tends to cause movement of the permanent magnet toward or away from the coil and a change in the spacing of the condenser lens from the laser source.

6. The laser light source of claim 5 wherein the permanent magnet is fixed to a movable element.

7. The laser light source of claim 5 wherein the permanent magnet is fixed in position relative to the condenser lens, and the magnetic coil is fixed in position relative to the laser source.

8. The laser light source of claim 5 wherein the permanent magnet is fixed in position relative to the laser source and the magnetic coil is fixed in position relative to the condenser lens.

9. A method of adjusting a laser beam of a laser scanning head used for reading a symbol on a target, to vary the spot size of the laser at the symbol to produce a spot size suited to reading the symbol, wherein the symbol is of a type having regions of different light reflective properties, and wherein the symbol is positioned at a range with respect to said laser scanning head, the method comprising the steps of:

positioning a laser source and emitting a laser beam from the source along an optical axis, passing the laser beam through an optical member positioned along the optical axis so that the laser beam is focused into a beam having a cross-sectional area in a plane orthogonal to the optical axis, which varies as a function of distance from the laser source, said cross-sectional area including a waist at which the cross-sectional area of the beam is smaller than at other locations, and moving the optical member along the optical axis relative to the laser source, the movement being independent of the measurement of the actual range of the symbol from the scanning head, so that the resulting variation in the range of the beam waist is independent of the actual range of the symbol further comprising synchronizing the variation in movement of the optical member with scanning of the beam across the symbols so that the range remains substantially constant for a predetermined number of scans before being further adjusted.

* * * * *